US011611602B2

(12) United States Patent
Gwock

(10) Patent No.: US 11,611,602 B2
(45) Date of Patent: Mar. 21, 2023

(54) METHOD AND SYSTEM FOR GROUP CALL USING UNICAST AND MULTICAST

(71) Applicant: LINE Plus Corporation, Seongnam-si (KR)

(72) Inventor: Jungnam Gwock, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/549,296

(22) Filed: Dec. 13, 2021

(65) Prior Publication Data
US 2022/0103608 A1    Mar. 31, 2022

Related U.S. Application Data

(63) Continuation of application No. 16/992,818, filed on Aug. 13, 2020, now Pat. No. 11,233,837.

(30) Foreign Application Priority Data

Aug. 14, 2019 (KR) .......................... 10-2019-0099571

(51) Int. Cl.
*H04L 29/06* (2006.01)
*H04L 65/611* (2022.01)
(Continued)

(52) U.S. Cl.
CPC .......... *H04L 65/611* (2022.05); *H04L 12/185* (2013.01); *H04L 12/189* (2013.01); *H04L 65/65* (2022.05); *H04L 65/4015* (2013.01)

(58) Field of Classification Search
CPC . H04L 65/4076; H04L 65/403; H04L 12/185; H04L 12/189; H04L 65/608; H04L 51/10; G06F 3/0486

(Continued)

(56) References Cited

U.S. PATENT DOCUMENTS

2007/0097995 A1* 5/2007 Kottilingal .............. H04L 67/54
370/466
2008/0312923 A1* 12/2008 Crinon .................. H04M 3/569
704/E15.001

FOREIGN PATENT DOCUMENTS

JP       2004535097 A  * 11/2008
KR    10-2005-0034455 A     9/2006
KR    10-2006-0105064 A    10/2006

OTHER PUBLICATIONS

Communication dated Aug. 19, 2020, issued by the Korean Intellectual Property Office in application No. 10-2019-0099571.

* cited by examiner

*Primary Examiner* — Glenford J Madamba
(74) *Attorney, Agent, or Firm* — Sughrue Mion, PLLC

(57) ABSTRACT

A method and a system for performing a group call using unicast and multicast are provided. A group call method performed by a first client device, may include: establishing a media session with a server providing a group call service based on a group call request from the first client device; transmitting, to the server through the media session, at least one first packet including a first source identifier of the first client device; providing a user interface at the first client device, that enables selecting at least one second client device from a plurality of second client devices that participate in a group call initiated by the first client device; and transmitting, from the first client device to the server, at least one second packet including a second source identifier of the selected at least one second client device as a destination of data included in the at least one second packet.

13 Claims, 10 Drawing Sheets

(51) Int. Cl.
*H04L 12/18* (2006.01)
*H04L 65/65* (2022.01)
*H04L 65/401* (2022.01)

(58) Field of Classification Search
USPC .......................................................... 455/518
See application file for complete search history.

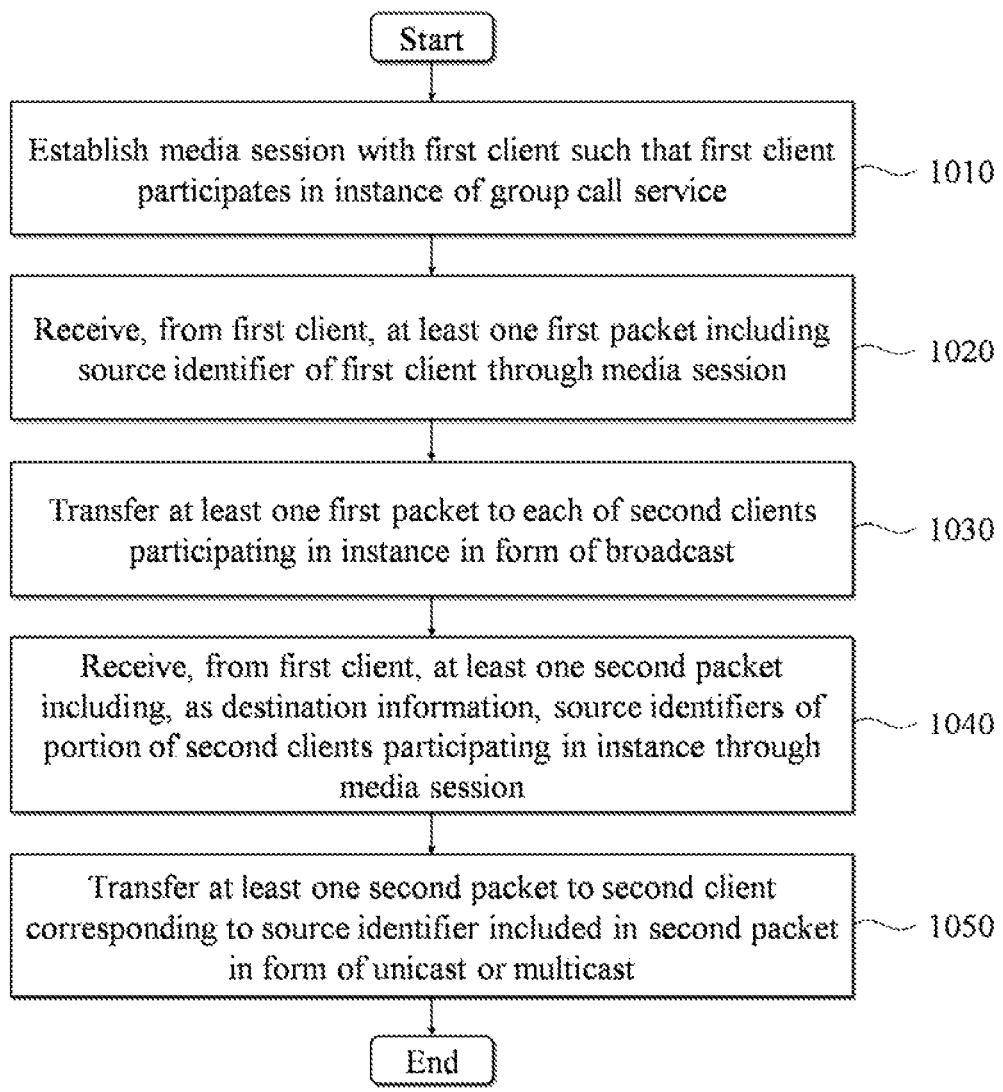

METHOD AND SYSTEM FOR GROUP CALL USING UNICAST AND MULTICAST

CROSS-REFERENCE TO RELATED APPLICATION

This application is a continuation application of U.S. application Ser. No. 16/992,818, filed Aug. 13, 2020, which claims priority from Korean Patent Application No. 10-2019-0099571, filed Aug. 14, 2019 in the Korean Intellectual Property Office (KIPO), the disclosures of which are incorporated herein by reference in their entireties.

BACKGROUND

1. Field

Apparatuses and methods consistent with example embodiments relate to providing a group call using unicast and multicast.

2. Description of Related Art

A conference call refers to a group call that allows a plurality of users to talk at the same time. For example, a group call service may be provided by a group telephone server that is configured to transfer audio data and media (e.g. as video) between group call participants. However, data transferred through the group call is transmitted to each of the group call participants in a corresponding instance of the group call. For example, in an instance of a group call participated in by five users including user 1, user 2, user 3, user 4, and user 5, data of audio/video of the user 1 is also transferred to each of the remaining users, that is, the user 2, the user 3, the user 4, and the user 5. That is, in the group call according to the related art, data is broadcasted at all times.

SUMMARY

Example embodiments provide a group call method and system that may transmit data in a form of unicast or multicast to selected participants among a plurality of participants in an instance of a group call during the progress of the corresponding instance.

According to an aspect of an example embodiment, there is provided a group call method performed by a first client device, the group call method including: establishing a media session with a server providing a group call service based on a group call request from the first client device; transmitting, to the server through the media session, at least one first packet including a first source identifier of the first client device; providing a user interface at the first client device, that enables selecting at least one second client device from a plurality of second client devices that participate in a group call initiated by the first client device; and transmitting, from the first client device to the server, at least one second packet including a second source identifier of the selected at least one second client device as a destination of data included in the at least one second packet.

The transmitting the at least one first packet may include transmitting the at least one first packet to each of the plurality of second client devices in a form of broadcast through the server. The transmitting the at least one second packet may include transmitting the at least one second packet to the selected at least one second client device in a form of unicast or multicast through the server.

The group call method may further include: generating the at least one second packet according to an extended transfer protocol of a real-time transport protocol (RTP) to include a field for recording at least one destination synchronization source (dSSRC) corresponding to the destination of the data included in the at least one second packet.

The at least one second packet generated according to the extended transfer protocol of the RTP may further include a field for counting a number of dSSRCs.

The group call method may further include: receiving, from the server, the second source identifier of the selected at least one second client device through the user interface; and adding the received second source identifier to the at least one second packet.

According to an aspect of another example embodiment, there is provided a group call method performed by a server, the method including: establishing a media session with a first client device based on a group call request from the first client device, to initiate a group call; receiving, from the first client device through the media session, at least one first packet including a first source identifier of the first client device; broadcasting the at least one first packet to each of a plurality of second client devices participating in the group call; receiving, from the first client device through the media session, at least one second packet including a second source identifier of at least one second client device selected from the plurality of second client device, as a destination of data included in the at least one second packet; and transferring data included in the at least one second packet to the at least one selected second client device in a form of unicast or multicast, based on the second identifier of the at least one selected second client device.

The at least one second packet may be generated at the first client device to include the second source identifier of the selected at least one second client device.

The at least one second packet may be generated at the first client device according to an extended transfer protocol of a real-time transport protocol (RTP) and transmitted. The at least one second packet generated according to the extended transfer protocol of the RTP may include a field for recording at least one destination synchronization source (dSSRC) corresponding to the destination of data included in the at least one second packet.

The at least one second packet transmitted according to the extended transfer protocol of the RTP may further include a field for counting a number of dSSRCs.

The group call method may further include: transmitting, to the first client device, the second source identifier of the selected at least one second client device in response to a request from the first client device for transmitting the data to the selected at least one second client device.

According to an aspect of another example embodiment, there is provided a non-transitory computer-readable record medium storing instructions that, when executed by a processor, cause the processor to perform the group call method.

According to an aspect of another example embodiment, there is provided a computer apparatus including: at least one memory configured to store computer-readable instructions; and at least one processor configured to execute the computer-readable instructions to: establish a media session among a first client device, a server providing a group call service, and a plurality of second client devices, based on a group call request from the first client device; receive, from the first client device through the media session, at least one first packet including a first source identifier of the first client device; broadcast the at least one first packet to each of the plurality of second client devices participating in a group call initiated by the first client device; receive, from the first client device through the media session, at least one second packet including, as a destination of data included in the at least one first packet, a second source identifier of at least one second client device selected from the plurality of second client devices; and transfer data included in the at least one second packet to the at least one selected second client device in a form of unicast or multicast, based on the second source identifier of the at least one selected second client device.

The at least one processor may be further configured to execute the computer-readable instructions to: identify the destination of the data included in the at least one second packet based on a type of the data and a user identifier included in the at least one second packet.

The at least one processor may be further configured to execute the computer-readable instructions to: identify an internet protocol address and a connection port of the at least one selected second client device, as the destination of the data included in the at least one second packet.

The type of the data may be a video data type or an audio data type. The at least one processor may be further configured to execute the computer-readable instructions to: identify an internet protocol address and a connection port of the at least one selected second client device, as the destination of the data included in the at least one second packet, based on whether the type of the data is the video data type or the audio data type.

The at least one processor may be further configured to execute the computer-readable instructions to: identify the destination of the data included in the at least one second packet based on the second source identifier included in the at least one second packet, and a look-up table indicating the destination associated with the second source identifier.

BRIEF DESCRIPTION OF THE FIGURES

The above and/or other aspects will be more apparent by describing certain example embodiments, with reference to the accompanying drawings, in which:

FIG. 10 is a flowchart illustrating an example of a group call method of a server according to at least one example embodiment.

DETAILED DESCRIPTION

Figure 1:
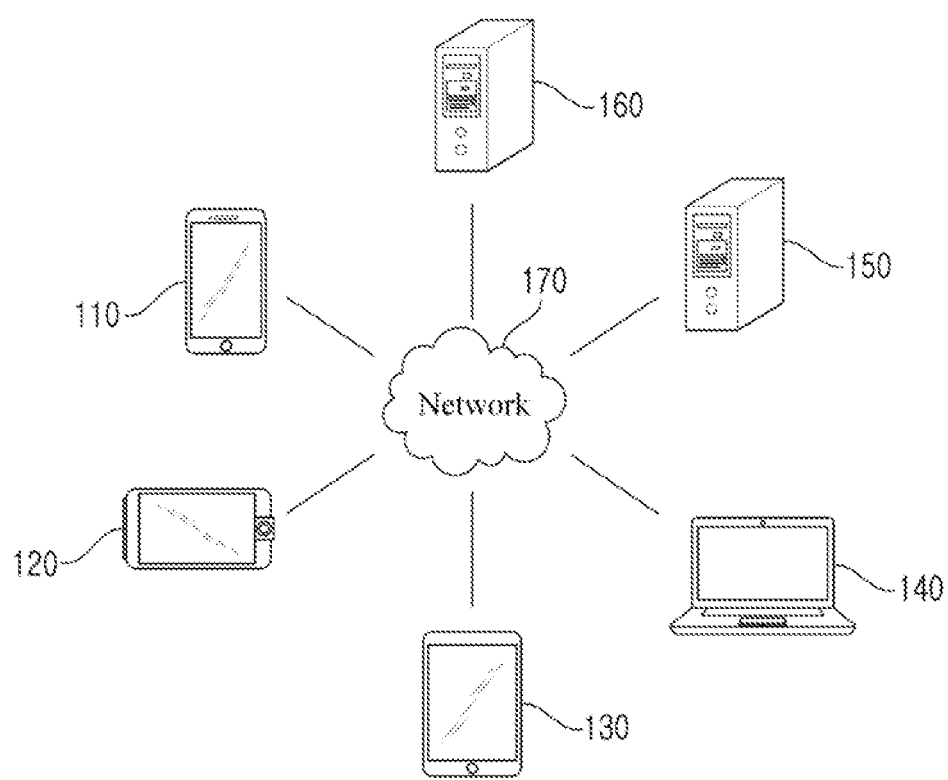
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings.

A group call system according to example embodiments may be implemented by at least one computer system, and a group call method according to example embodiments may be performed through at least one computer apparatus included in the group call system. Here, a computer program according to example embodiments may be installed and executed on the computer apparatus, and the computer apparatus may perform the group call method under control of the executed computer program. The computer program may be stored in a computer-readable storage medium to execute the group call method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided to describe one example among environments applicable to the example embodiments. An environment applicable to the example embodiments is not limited to the network environment of FIG. 1.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, and the like through communication with the plurality of electronic devices 110, 120, 130, and 140 over the network 170. For example, the server 150 may be a system that provides a service (e.g., a group call service or an audio conferencing service, a messaging service, a mail service, a social network service, a map service, a translation service, a financial service, a payment service, a search service, and a content providing service) to the plurality of electronic devices 110, 120, 130, and 140 connected over the network 170.

Figure 2:
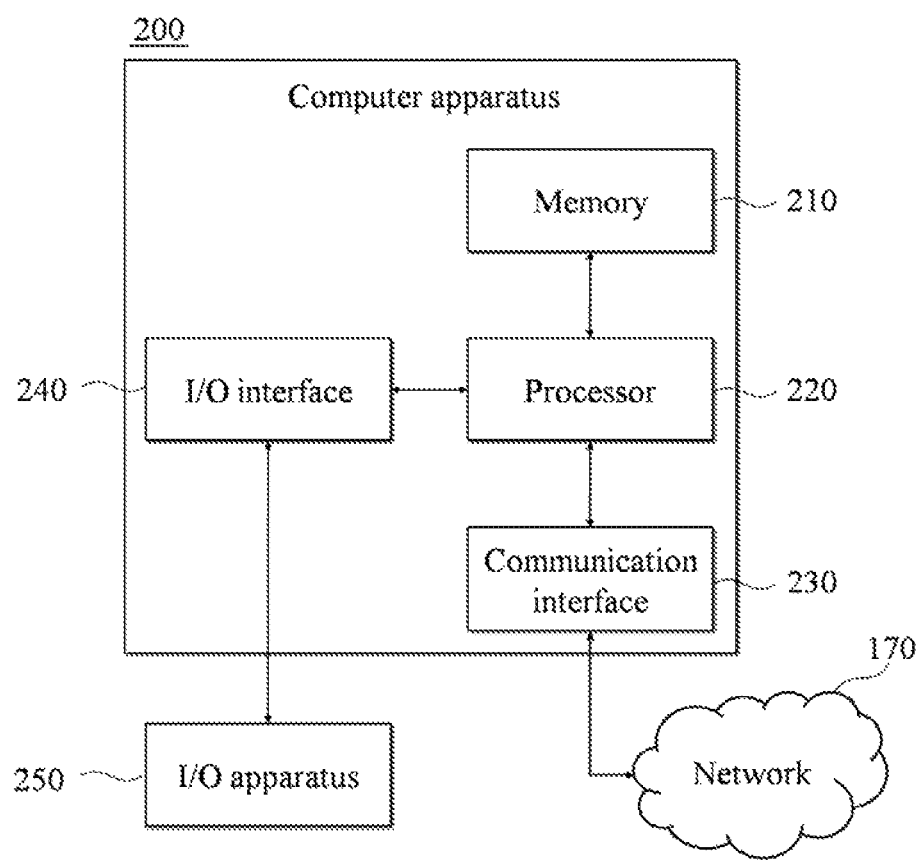
FIG. 2 is a diagram illustrating an example of a computer apparatus according to at least one example embodiment.

FIG. 2 is a block diagram illustrating an example of a computer apparatus according to at least one example embodiment. For example, each of the plurality of electronic devices 110, 120, 130, and 140 or each of the plurality of servers 150 and 160 may be implemented using a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access (RAM), read only memory (ROM), and a disc drive, as a non-transitory computer-readable storage medium. Here, the permanent mass storage device, such as ROM and disc drive, may be included in the computer apparatus 200 as a separate permanent storage device different from the memory 210. Also, an operating system (OS) and at least one program code may be stored in the memory 210. Such software components may be loaded from another non-transitory computer-readable storage medium to the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, the software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 220.

The communication interface 230 may provide a function for communication between the computer apparatus 200 and another apparatus, for example, the aforementioned storage devices, over the network 170. For example, the processor 220 of the computer apparatus 200 may transfer data, a file, a request or an instruction created based on the program code stored in the storage device, such as the memory 220, to other apparatuses over the network 170 under control of the communication interface 230. The computer apparatus 200 may receive a signal, an instruction, data, a file, a command, and the like from another apparatus through the communication interface 230 of the computer apparatus 200. For example, a signal, an instruction, data, a command, and the like received through the communication interface 230 may be transferred to the processor 220 or the memory 210, and content, a file, and the like may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, and a mouse, and an output device may include a device, such as a display device and a speaker. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. For example, the computer apparatus 200 may include at least a portion of the I/O apparatus 250, or may further include other components, for example, a transceiver, a database (DB), and the like.

Figure 3:
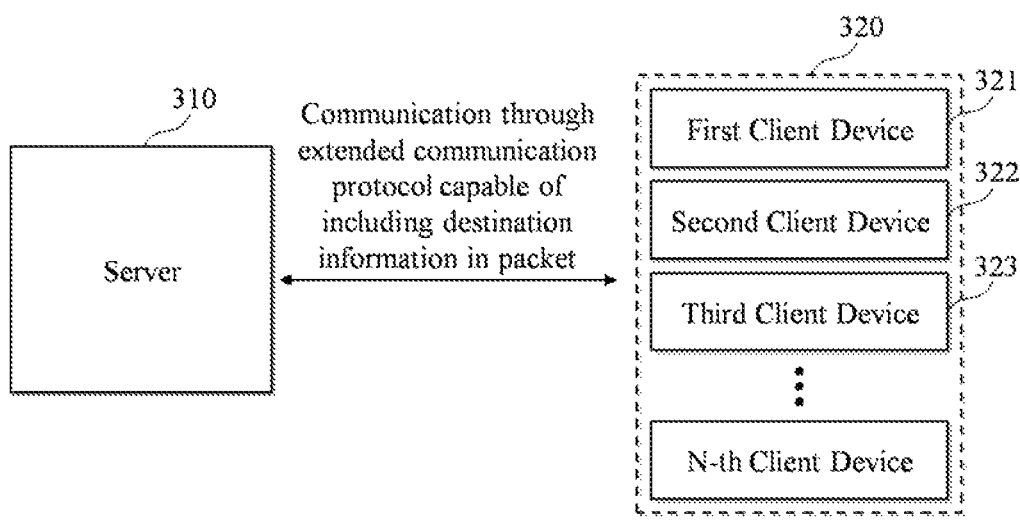
FIG. 3 illustrates an example of a group call system according to at least one example embodiment.

FIG. 3 illustrates an example of a group call system according to at least one example embodiment. The group call system according to the example embodiment may include a server 310 configured to provide a group call service and client devices 320 for a plurality of participants. Here, unlike the existing art, communication between the server 310 and the client devices 320 may be performed through an extended transfer protocol capable of including destination information in a packet according to example embodiments. For example, a case in which a first client device 321, a second client device 322, and a third client device 323 among the client devices 320 participate in a single group call instance may be considered. In this case, each of the first client device 321, the second client device 322, and the third client device 323 that participate in the corresponding group call instance may designate a specific participant and may transmit a packet. For example, the first client device 321 may designate the third client device 323 and may transfer media data, such as audio or video, to the designated third client 323.

That is, according to the example embodiment, a participant of a group call service may transmit data to all of participants of a corresponding group call instance and may also transmit data to a specific participant or a small group of specific participants.

Figure 4:
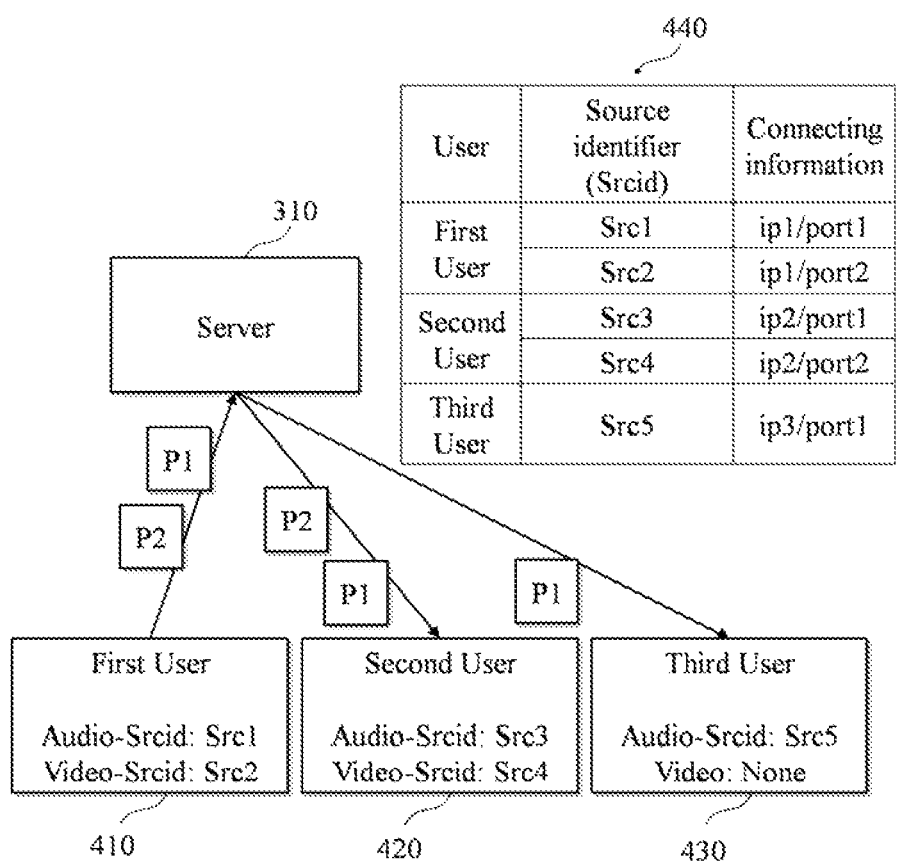
FIGS. 4 to 6 illustrate examples of a group call process according to at least one example embodiment.
Figure 5:
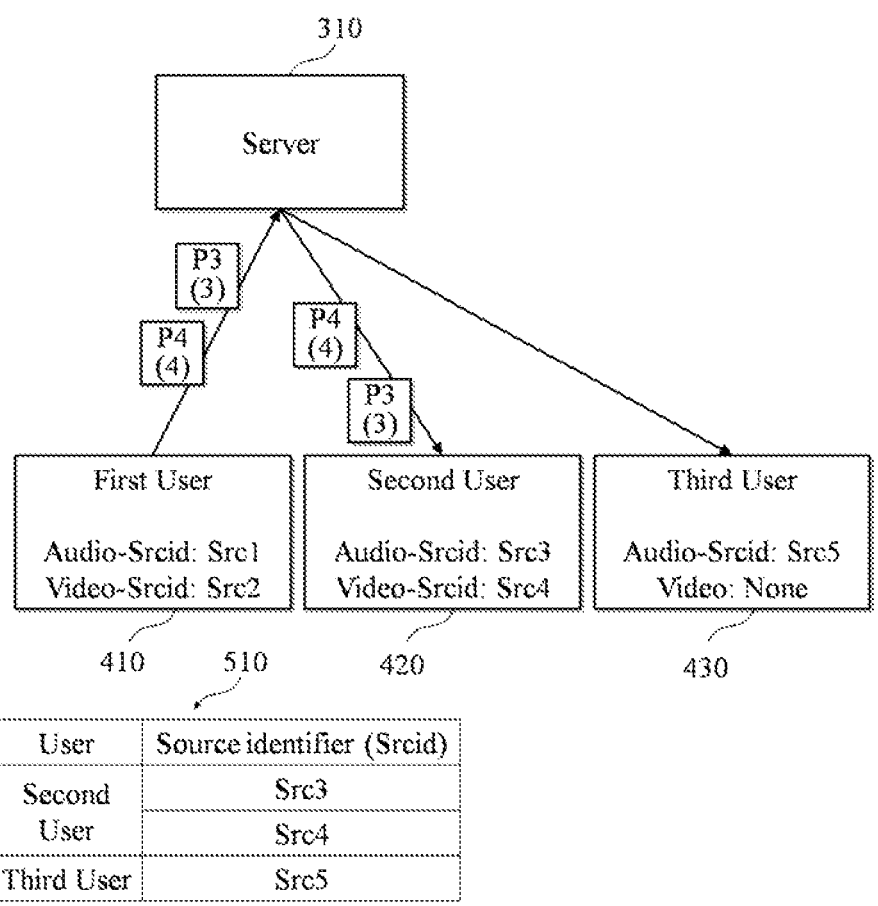
Figure 6:
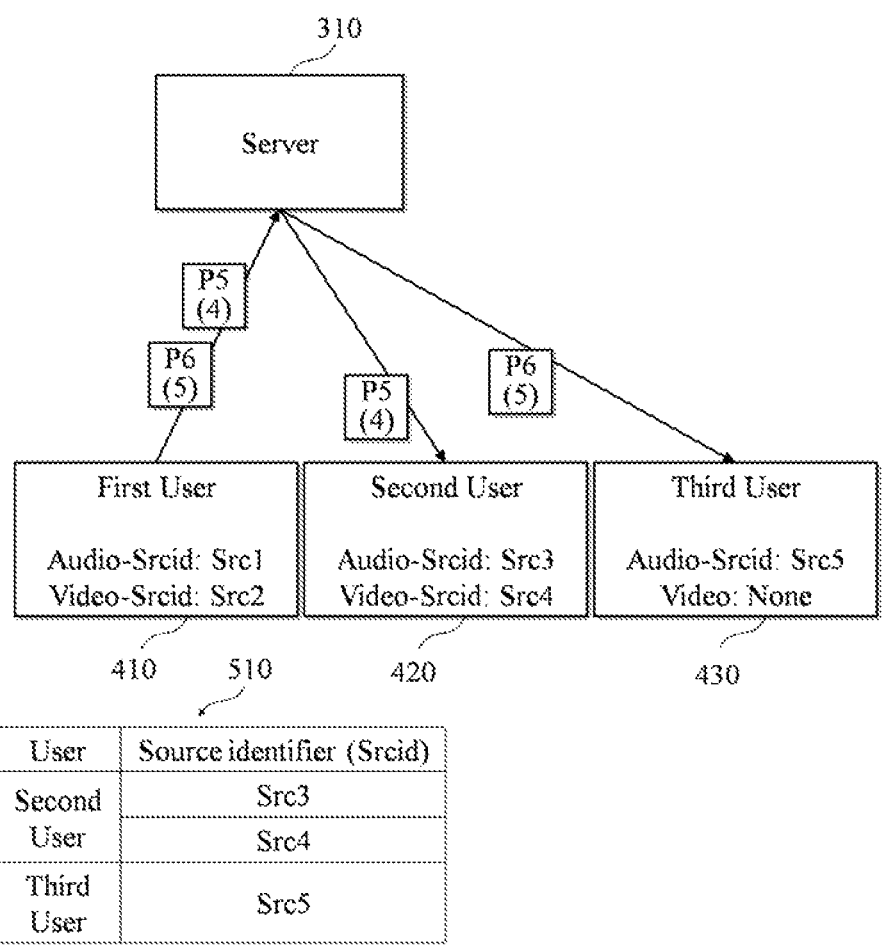

FIGS. 4 to 6 illustrate examples of a group call process according to at least one example embodiment.

FIG. 4 illustrates an example in which a first user 410, a second user 420, and a third user 430 participate in a group call instance. Here, each of the first user 410, the second user 420, and the third user 430 may correspond to one of the client devices 320 of FIG. 3. Here, the server 310 may manage a table that includes source identifier (Srcid) and connecting information for each of the first user 410, the second user 420, and the third user 430 as shown in a table 440. The table 400 may be stored in the server 310, a client device of the first user 410, or a memory provided separated from the server and the client device of the first user 410. The source identifier (Srcid) refers to a unique value for each group call and, generally, may be used to identify a user who transmits data to the server 310, as a source of the data received at the server 310. The source identifier may also indicate a type of the source (e.g., an audio data source, a video data source, a still image data source, a text data source), along with the user who transmits the data (e.g., user A or user B). In addition, according to some example embodiment, the source identifier may be used to identify, as a source of data, one of the client devices 320 which transmits the data to the server 310 in association with connecting information, that is, to identify destination information of the data. Although not illustrated, the source identifier (Srcid) and the connecting information may be managed as a single table with other information about the first user 410, the second user 420, and the third user 430. The connecting information may include an Internet protocol (IP) address and a connection port of the client devices of the first user 410, the second user 420, and the third user 430. In response to receiving, from a client device of each user, a request for initiating or participating in a group call with call related information, such as a type of media to be transmitted or received, the server 310 may manage a table, such as the table 440, by allocating at least one source identifier based on call related information received from the client device. The server 310 may transmit, to the client device initiating or participating in the group call, the source identifier allocated to the corresponding client device. Also, if other users are participating in the group call, the server 310 may transmit source identifiers of at least a portion of the other users participating in the group call to the client device of the user participating in the group call. Also, the server 310 may transmit source identifiers of at least a portion of other users participating in the group call to the client device of the user participating in the group call in response to a request from the client device or based on determination of the server 310, during the group call. For example, it is assumed that, during a group call between the first user 410 and the second user 420 using all of video and audio, the third user 430 participates in the group call between the first user 410 and the second user 420 using the third client device 323 equipped with only an audio device. In response to the server 310 receiving a request from the third user 430 for participating in the group call with call related information of the third user 430, the server 310 may allocate a source identifier Src5 to the third user 430 and may store the source identifier Src5 in the table in association with connecting information ip3/port1 corresponding to the source identifier Src5. Here, the server 310 may transmit, to the third client device 323 of the third user 430, source identifier information of the first user 410 and the second user 420 already participating in the group call with the source identifier Src5 allocated to the third user 430. Also, the server 310 may notify the first user 410 and the second user 420 already participating in the group call that the source identifier of the third user 430 is Src5.

Here, referring to FIG. 4, it is assumed that, when the first user1 410, the second user 420, and the third user 430 are participating in the group call, the first user 410 transmits a packet P1 and a packet P2 to the server 310 without designating at least a portion of users. Here, each of the packets P1 and P2 may include a source identifier. For example, when the packet P1 includes audio data and the packet P2 includes video data, the packet P1 may include a source identifier Src1 of the first user 410 for audio and the packet P2 may include a source identifier Src2 of the first user 410 for video. In this case, the server 310 may be aware that the packet P1 includes audio data from the source identifier Src1 included in the packet P1, and may transfer the packet P1 to user devices of the second user 420 and the third user 430 having audio sources through ip2/port1 and ip3/port1 by referring to the table 440. Also, the server 310 may be aware that the packet P2 includes video data from the source identifier Src2 included in the packet P2, and may transfer the packet P2 to the user device of the second user 420 having the video source through ip2/port2 by referring to the table 440. Here, since a video source is not allocated to the third user 430, the packet P2 is not transferred to the third user 430.

FIG. 5 illustrates an example of a process in which the first user 410 transfers audio and video of the first user 410 only to the second user 420 during a group call. In response to receiving a request from the first user 410 for transferring audio and video only to the second user 420 during the group call, the server 310 may include destination information in a packet transmitted from the first user 410 and transfer the packet, which differs from an example in which a destination is not specified. During the group call, the server 310 may receive a packet P3 including audio and a packet P4 including video data, and may also receive a request for transferring the audio and video only to the second user 420. The request for transferring the audio and video only to the second user 420 may be included in each of the packet P3 and the packet P4, or may be transmitted from the first user 410 to the server 310 separately from the packet P3 and the packet P4. The packet P3 and the packet P4 may include a source identifier Src3 and a source identifier Src4, respectively, and in response thereto, the server 310 may identify the source identifier Src3 as a destination of the packet P3 that includes the audio of the first user 410, and may identify the source identifier Src4 as a destination of the a packet P4 that includes the video of the first user 410, based on a table 510 of FIG. 5. The table 510 may be stored in a client device of the first user 410, the server 310, or a memory that is separately provided from the client device of the first user 410 and the server 310. In another example, the packets P3 and P4 transmitted from the client device of the first user 410 may include a user identifier of the second user 420, in addition to the audio and the video respectively included in the packets P3 and P4, but may not include the source identifier Src3 and the source identifier Src4. Upon receipt of the packet P3, the server 310 may determine the source identifier Src3 as a destination of the packet P3 (or as a destination of data included in the packet P3 received from the first user 410) based on the user identifier (e.g., "User 2") of the second user 420 and the type of the data (i.e., audio type) included in the packet 3, with reference to the table 440 and/or table 510. Also, upon receipt of the packet P4, the server 310 may determine the source identifier Src4 as a destination of the packet P4 (or as a destination of data included in the packet P4 received from the first user 410) based on the user identifier (e.g., "User 2") of the second user 420 and the type of the data (i.e., video type) included in the packet 4, with reference to the table 440 and/or table 510.

The server 310 may transfer the packet P3 to ip2/port1 of the second user 420 corresponding to the source identifier Src3 designated in the packet P3 and may transfer the packet P4 to ip2/port2 of the second user 420 corresponding to the source identifier Src4 designated in the packet P4, by referring to the table 440 of FIG. 4. Such a source identifier may be designated in a packet from the first user 410 until the request for transferring audio or video of the first user 410 only to the second user 420 during the group call is released from the first user 410.

FIG. 6 illustrates an example of a process in which the first user 410 transfers only video of the first user 410 to the second user 420 and transfers only audio of the first user 410 to the third user 430 during a group call. In response to receiving a request from the first user 410 for transferring video of the first user 410 only to the second user 420 and audio of the first user 410 only to the third user 430, the server 310 may include destination information in a packet transmitted from the first user 410 and transfer the packet, which differs from an example in which a destination is not specified. During the group call, the request for transferring video of the first user 410 only to the second user 420 and audio of the first user 410 only to the third user 430 may be received from the first user 410. In response thereto, a source identifier Src4 may be designated as a destination of a packet P5 for the video of the first user 410 and a source identifier Src5 may be designated as a destination of a packet P6 for the audio of the first user 410, based on source identifiers of other users obtained, for example, by referring to a table 610 of FIG. 6. In this case, the server 310 may transfer the packet P5 to ip2/port2 of the second user 420 corresponding to the source identifier Src4 designated in the packet P5 and may transfer the packet P6 to ip3/port1 of the third user 430 corresponding to the source identifier Src5 designated in the packet P6, by referring to the table 440 of FIG. 4.

As described above, an existing transfer protocol may be extended to designate destination information. Such existing transfer protocols transfer a packet to all of participants in a form of broadcast and thus, do not need to designate a destination. Accordingly, there is no field to include destination information. The example embodiment may extend the existing transfer protocol by adding a field for designating destination information using a reserved area in a header of a packet according to the existing transfer protocol.

Figure 7:
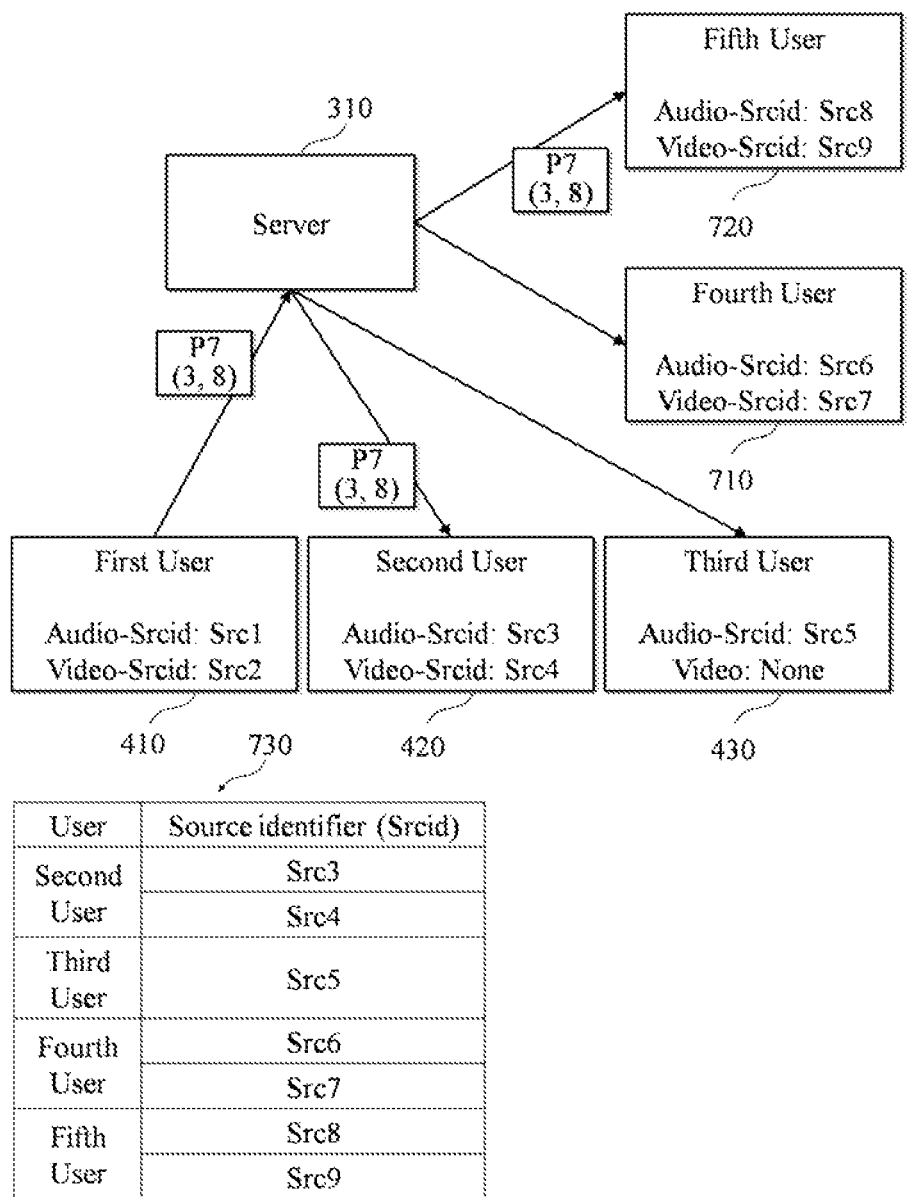
FIG. 7 illustrates an example of an extended container format based on an extended transfer protocol according to at least one example embodiment.

Also, at least two users may be designated for a single packet. In FIG. 7, a case in which a fourth user 710 and a fifth user 720 as well as the first user 410, the second user 420, and the third user 430 further participate in a group call instance is considered. FIG. 7 illustrates an example in which the first user 410 designates the second user 420 and the fifth user 720 and transfers audio data. In response to receiving a request from the first user 410 for transferring audio only to the second user 420 and the fifth user 720, the server 310 may include destination information in a packet transmitted from the first user 410 and may transfer the packet, which differs from an example in which a destination is not specified. During the group call, a request for transferring audio only to the second user 420 and the fifth user 720 may be received from the first user 410. In response thereto, source identifiers Src3 and Src8 may be designated as destination information in a packet P7 that includes audio of the first user 410, based on source identifiers of other users received from the server 310, for example, by referring to a table 730 of FIG. 7. In this case, the server 310 may transfer the packet P7 to each of the second user 420 and the fifth user 720 through connecting information of the second user 420 corresponding to the source identifier Src3 and connecting information of the fifth user 720 corresponding to the source identifier Src8, which are designated in the packet P7.

In FIGS. 4-8, while the same names are given to the packets transmitted from the first user 410 to the server 310 (e.g., the packets P3 and 4 transmitted from the first user 410 to the server 310 in FIG. 5) and the packets transmitted from the server 310 to another user (e.g., the packets P3 and P4 transmitted from the server 310 to the second user 420), the packets transmitted from the server 310 to the other user are not necessarily the same as the packets transmitted from the first user 410 to the server 310 because the server 310 may modify the packets received from the first user 410 or may generate new packets based on data or information included in the packets received from the first user 410.

Figure 8:
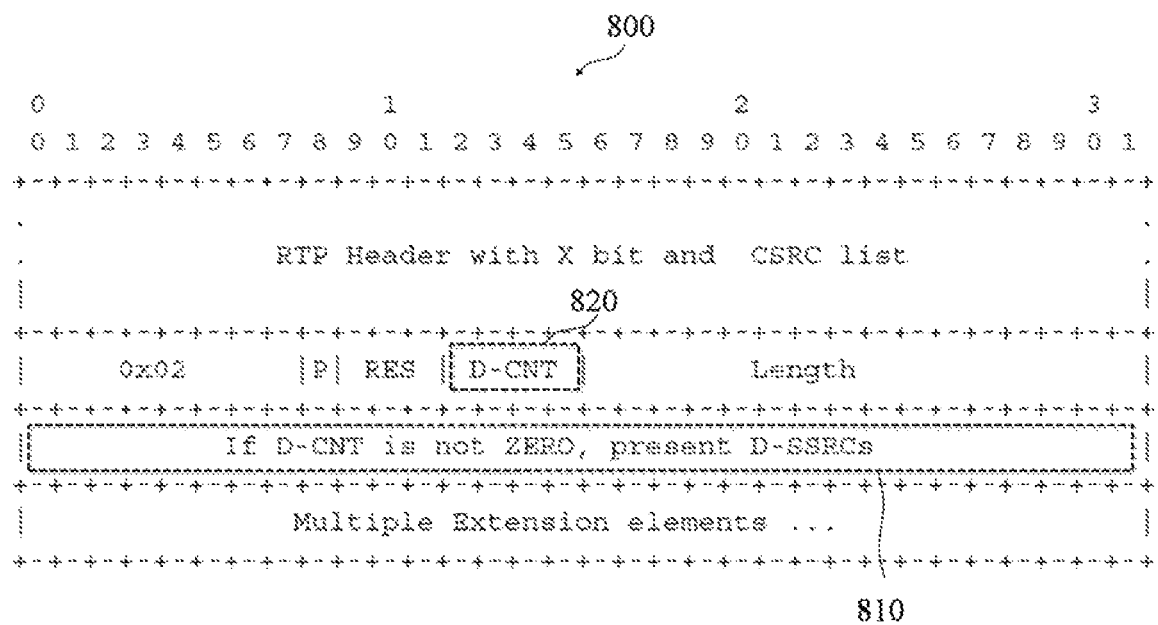
FIG. 8 illustrates an example of an extended container format based on an extended transfer protocol according to at least one example embodiment.

FIG. 8 illustrates an example of an extended container format based on an extended transfer protocol according to at least one example embodiment. FIG. 8 illustrates a container format 800 of an extended transfer protocol of a real-time transport protocol (RTP). Here, destination synchronization sources (dSSRCs) may be newly defined to manage destinations to correspond to synchronization sources (SSRCs) for managing sources in the extended transfer protocol of the RTP. Here, a first box 810 indicated with dotted lines may represent a field for recording dSSRCs (D-SSRCs) in an RTP packet header. Here, recording a dSSRC may represent recording an identifier of the dSSRC. Also, D-CNT for counting a number of dSSRCs to correspond to CC for counting a number of SSRCs may be newly defined. In FIG. 8, a second box 820 indicated with dotted lines may represent a field for counting a number of dSSRCs. In this case, a client may designate another client to which a packet is to be transferred by adding a dSSRC to the packet, and the server 310 may verify a destination to which the packet is to be transferred through the dSSRC included in the packet received from the client and may transmit the packet to the verified destination.

Figure 9:
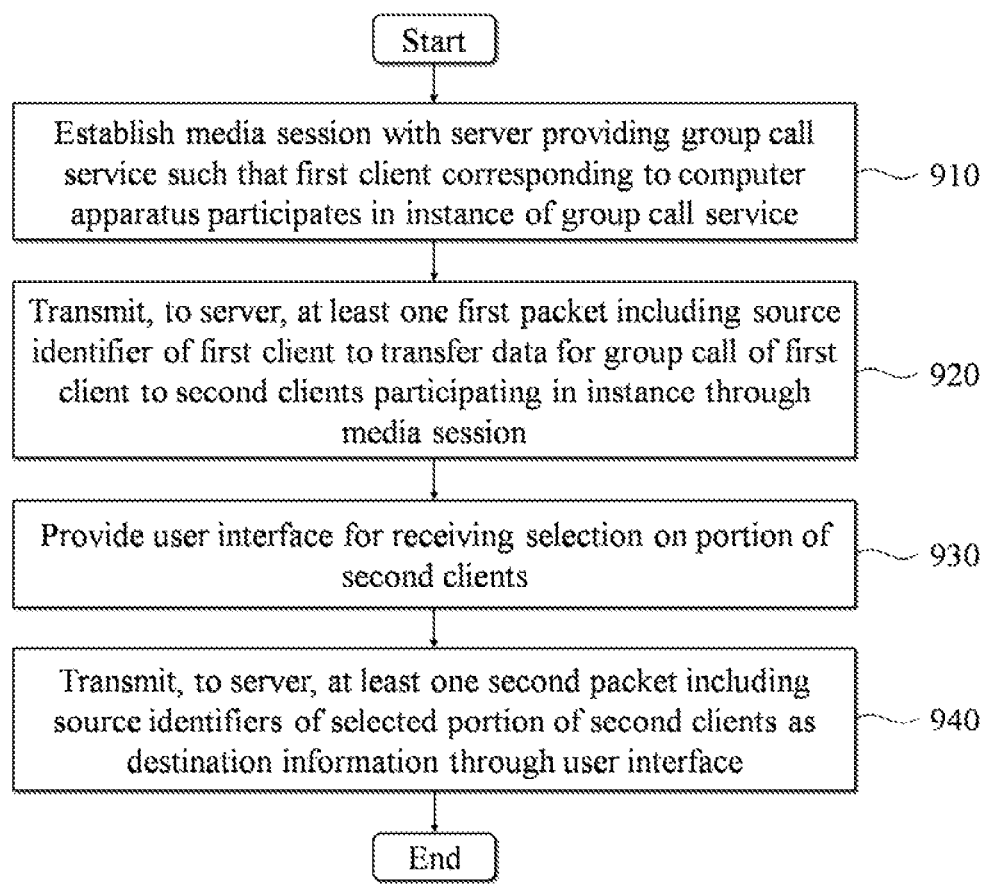
FIG. 9 is a flowchart illustrating an example of a group call method of a client according to at least one example embodiment.

FIG. 9 is a flowchart illustrating an example of a group call method of a client according to at least one example embodiment. The group call method of FIG. 9 may be performed by the computer apparatus 200 that implements a client configured to participate in a group call service. In this case, the processor 220 of the computer apparatus 200 may be configured to execute a control instruction according to a code of at least one program or a code of an OS included in the memory 210. Here, the processor 220 may control the computer apparatus 200 to perform operations 910 to 940 included in the method of FIG. 9 in response to a control instruction provided from a code stored in the computer apparatus 200.

Referring to FIG. 9, in operation 910, the computer apparatus 200 may establish a media session with a server providing a group call service such that a first client participates in an instance of the group call service. The first client may be implemented by the computer apparatus 200 through a computer program installed and executed on the computer apparatus 200 for a group call. To participate in a specific instance for the group call, the computer apparatus 200 may establish the media session with the server.

In operation 920, the computer apparatus 200 may transmit, to the server, at least one first packet including a source identifier of the first client to transfer data for the group call of the first client to second clients participating in the instance through the media session. Here, the first packet may refer to a packet of which a destination is not designated. For example, in the container format 800 of FIG. 8, if D-CNT is zero in, a dSSRC is not included in a packet and the packet may be the first packet of which the destination is not designated. The at least one first packet may be transferred to each of the second clients participating in the instance in a form of broadcast through the server.

In operation 930, the computer apparatus 200 may provide a user interface for receiving a selection on a portion of the second clients. The second clients participating in the instance may correspond to participants that participate in the instance of the group call. The user interface may include functions for selecting a portion of participants that participate in the instance of the group call service. Depending on example embodiments, a portion of the participants may be selected by grouping a portion of the participants participating in the instance into a single small group and selecting the small group.

In operation 940, the computer apparatus 200 may transmit, to the server, at least one second packet including source identifiers of the selected portion of the second clients as destination information through the user interface. Here, the source identifier may be information previously received from the server and the second packet may refer to a packet of which a destination is designated. For example, in the container format 800 of FIG. 8, if D-CNT is not zero in, it may represent a case in which a dSSRC is recorded and the recorded dSSRC may represent a destination of the packet. The at least one second packet may be transferred to the portion of the second clients corresponding to the destination information in a form of unicast or multicast through the server. If the computer apparatus 200 is unaware of source identifiers of the second clients, the computer apparatus 200 may receive, from the server, source identifiers of the second clients participating in the instance through communication with the server or the source identifiers of the selected portion of second clients through the user interface and may add the received source identifiers to the at least one second packet.

As described above, the at least one second packet may be generated according to an extended transfer protocol of an RTP and transmitted to the server. Here, the at least one second packet generated according to the extended transfer protocol of the RTP may include a field for recording at least one dSSRC corresponding to destination information. Also, the at least one second packet generated according to the extended transfer protocol of the RTP may further include a field for counting a number of dSSRCs.

FIG. 10 is a flowchart illustrating an example of a group call method of a server according to at least one example embodiment. The group call method of FIG. 10 may be performed by the computer apparatus 200 that implements a server configured to provide a group call service. In this case, the processor 220 of the computer apparatus 200 may be configured to execute a control instruction according to a code of at least one program or a code of an OS included in the memory 210. Here, the processor 220 may control the computer apparatus 200 to perform operations 1010 to 1050 included in the method of FIG. 10 in response to a control instruction provided from the computer apparatus 200.

Referring to FIG. 10, in operation 1010, the computer apparatus 200 may establish a media session with a first client such that the first client participates in an instance of a group call service. Here, the first client may be implemented by a terminal of a first participant through a computer program installed and executed on the terminal of the first participant for a group call. To participate in a specific instance for the group call, the server and the terminal of the first participant may establish the media session.

In operation 1020, the computer apparatus 200 may receive, from the first client, at least one first packet including a source identifier of the first client through the media session. Here, the first packet may refer to a packet of which a destination is not designated. For example, in the container format 800 of FIG. 8, if D-CNT is zero, a dSSRC is not included in a packet and the packet may be the first packet of which the destination is not designated.

In operation 1030, the computer apparatus 200 may transfer the at least one first packet to each of second clients participating in the instance in a form of broadcast. That is, the first packet may be transferred to each of all the participants participating in the instance.

In operation 1040, the computer apparatus 200 may receive, from the first client, at least one second packet including, as destination information, source identifiers of a portion of the second clients participating in the instance through the media session. The second packet may refer to a packet of which a destination is designated. For example, in the container format 800 of FIG. 8, if D-CNT is not zero in, it may represent a case in which a dSSRC is recorded and the recorded dSSRC may represent a destination of the packet. If the first client is unaware of the source identifiers of the second clients, the first client may request the computer apparatus 200 for the source identifiers of the second clients. In this case, in response to the request from the first client, the computer apparatus 200 may transmit, to the first client, source identifiers of the second clients participating in the instance or source identifiers of a portion of second clients selected by the first client.

In operation 1050, the computer apparatus 200 may transfer the at least one second packet to a second client corresponding to a source identifier included in the second packet in a form of unicast or multicast. Therefore, the second packet may be transferred to a portion of the second clients designated by the first client instead of being transmitted to all of the second clients that participate in the instance of the group call service.

Although the example embodiments are described based on examples in which a participant designates a destination, for example, a source identifier, a server may arbitrarily designate a destination of a specific packet depending on example embodiments. For example, if a specific participant desires to call audio or video during a group call, the server may designate a destination of a packet for corresponding audio or video as the corresponding specific participant such that the corresponding audio or video may be transferred to the specific participant.

According to some example embodiments, it is possible to transmit data in a form of unicast or multicast to a portion of participants participating in an instance of a group call during the progress of the corresponding instance.

The apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A group call method performed by a first client device, the group call method comprising:
   establishing a media session with a server providing a group call service based on a group call request from the first client device;
   transmitting, to the server through the media session, at least one first packet including a first source identifier of the first client device;
   providing a user interface at the first client device, that enables selecting at least one second client device from a plurality of second client devices that participate in a group call initiated by the first client device;

in response to the at least one second client device being selected from the plurality of second client devices, receiving, from the server, the second source identifier of the selected at least one second client device through the user interface;

adding the received second source identifier to at least one second packet; and transmitting, from the first client device to the server, the at least one second packet including a second source identifier of the selected at least one second client device as a destination of data included in the at least one second packet, wherein the transmitting the at least one first packet comprises transmitting the at least one first packet to each of the plurality of second client devices in a form of broadcast through the server, and wherein the transmitting the at least one second packet comprising transmitting the at least one second packet to the selected at least one second client device in a form of unicast or multicast through the server.

2. The group call method of claim 1, further comprising:
generating the at least one second packet according to an extended transfer protocol of a real-time transport protocol (RTP) to comprise a field for recording at least one destination synchronization source (dSSRC) corresponding to the destination of the data included in the at least one second packet.

3. The group call method of claim 2, wherein the at least one second packet generated according to the extended transfer protocol of the RTP further comprises a field for counting a number of dSSRCs.

4. A group call method performed by a server, the method comprising:
establishing a media session with a first client device based on a group call request from the first client device, to initiate a group call;
receiving, from the first client device through the media session, at least one first packet including a first source identifier of the first client device;
broadcasting the at least one first packet to each of a plurality of second client devices participating in the group call;
receiving, from the first client device through the media session, at least one second packet comprising a second source identifier of at least one second client device selected from the plurality of second client device, as a destination of data included in the at least one second packet, wherein the second source identifier of the at least one second client device is added to the at least one second packet by the first client device, in response to the at least one second client device being selected from the plurality of second client devices via a user interface of the first client device; and
transferring data included in the at least one second packet to the at least one selected second client device in a form of unicast or multicast, based on the second identifier of the at least one selected second client device.

5. The group call method of claim 4, wherein the at least one second packet is generated at the first client device according to an extended transfer protocol of a real-time transport protocol (RTP) and transmitted, and
the at least one second packet generated according to the extended transfer protocol of the RTP comprises a field for recording at least one destination synchronization source (dSSRC) corresponding to the destination of data included in the at least one second packet.

6. The group call method of claim 5, wherein the at least one second packet transmitted according to the extended transfer protocol of the RTP further comprises a field for counting a number of dSSRCs.

7. The group call method of claim 4, further comprising:
transmitting, to the first client device, the second source identifier of the selected at least one second client device in response to a request from the first client device for transmitting the data to the selected at least one second client device.

8. A non-transitory computer-readable record medium storing instructions that, when executed by a processor, cause the processor to perform the group call method of claim 1.

9. A computer apparatus comprising:
at least one memory configured to store computer-readable instructions; and
at least one processor configured to execute the computer-readable instructions to:
establish a media session among a first client device, a server providing a group call service, and a plurality of second client devices, based on a group call request from the first client device,
receive, from the first client device through the media session, at least one first packet including a first source identifier of the first client device,
broadcast the at least one first packet to each of the plurality of second client devices participating in a group call initiated by the first client device,
receive, from the first client device through the media session, at least one second packet comprising, as a destination of data included in the at least one first packet, a second source identifier of at least one second client device selected from the plurality of second client devices, wherein the second source identifier of the at least one second client device is added to the at least one second packet by the first client device, in response to the at least one second client device being selected from the plurality of second client devices via a user interface of the first client device, and
transfer data included in the at least one second packet to the at least one selected second client device in a form of unicast or multicast, based on the second source identifier of the at least one selected second client device.

10. The computer apparatus of claim 9, wherein the at least one processor is further configured to execute the computer-readable instructions to:
identify the destination of the data included in the at least one second packet based on a type of the data and a user identifier included in the at least one second packet.

11. The computer apparatus of claim 10, wherein the at least one processor is further configured to execute the computer-readable instructions to:
identify an internet protocol address and a connection port of the at least one selected second client device, as the destination of the data included in the at least one second packet.

12. The computer apparatus of claim 10, wherein the type of the data is a video data type or an audio data type; and
wherein the at least one processor is further configured to execute the computer-readable instructions to:
identify an internet protocol address and a connection port of the at least one selected second client device, as the destination of the data included in the at least one second packet, based on whether the type of the data is the video data type or the audio data type.

13. The computer apparatus of claim 9, wherein the at least one processor is further configured to execute the computer-readable instructions to:
   identify the destination of the data included in the at least one second packet based on the second source identifier included in the at least one second packet, and a look-up table indicating the destination associated with the second source identifier.

\* \* \* \* \*